US010867602B2

(12) United States Patent
Yuan

(10) Patent No.: US 10,867,602 B2
(45) Date of Patent: Dec. 15, 2020

(54) METHOD AND APPARATUS FOR WAKING UP VIA SPEECH

(71) Applicant: BAIDU ONLINE NETWORK TECHNOLOGY (BEIJING) CO., LTD., Beijing (CN)

(72) Inventor: Bin Yuan, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 187 days.

(21) Appl. No.: 16/099,943

(22) PCT Filed: Dec. 21, 2016

(86) PCT No.: PCT/CN2016/111367
§ 371 (c)(1),
(2) Date: Nov. 8, 2018

(87) PCT Pub. No.: WO2017/202016
PCT Pub. Date: Nov. 30, 2017

(65) Prior Publication Data
US 2019/0139545 A1    May 9, 2019

(30) Foreign Application Priority Data
May 26, 2016  (CN) .......................... 2016 1 0357702

(51) Int. Cl.
*G10L 15/22*   (2006.01)
*G10L 15/04*   (2013.01)
(Continued)

(52) U.S. Cl.
CPC .............. *G10L 15/22* (2013.01); *G10L 15/04* (2013.01); *G10L 15/063* (2013.01); *G10L 15/08* (2013.01);
(Continued)

(58) Field of Classification Search
CPC ....... G10L 15/14; G10L 15/144; G10L 15/22; G10L 15/223; G10L 15/20
See application file for complete search history.

(56) References Cited

U.S. PATENT DOCUMENTS 5,956,673 A * 9/1999 Weaver, Jr. ......... H04W 88/181
455/436
9,275,637 B1 * 3/2016 Salvador ................. G10L 15/06
(Continued)

FOREIGN PATENT DOCUMENTS

CN    104464723 A    3/2015
CN    105210146 A    12/2015
(Continued)

OTHER PUBLICATIONS

PCT/CN2016/111367 English translation of International Search Report dated Jan. 26, 2017, 2 pages.
(Continued)

*Primary Examiner* — Michael N Opsasnick
(74) *Attorney, Agent, or Firm* — Lathrop GPM LLP

(57) ABSTRACT

The present disclosure provides a method and an apparatus for waking up via a speech. The method includes: obtaining a speech signal; decoding the speech signal according to a pre-generated searching space to obtain a speech recognition result, in which the searching space includes a path where an inversion model is located, the inversion model includes a first inversion model generated by training based on one or more word segmentation results of each of one or more wake-up phrases; when the first preset number of words of the speech recognition result is obtained, determining whether the preset number of words contains at least part of words in one of the one or more wake-up phrases; and determining cancellation of a wake-up operation directly if does not contain at least part of words in one of the one or
(Continued)

more wake-up phrases, and ending the decoding of the speech signal.

17 Claims, 4 Drawing Sheets

(51) Int. Cl.
| | |
|---|---|
| *G10L 15/06* | (2013.01) |
| *G10L 15/08* | (2006.01) |
| *G10L 21/0232* | (2013.01) |
| *G10L 25/84* | (2013.01) |
| *G10L 21/0208* | (2013.01) |
| *G10L 21/0316* | (2013.01) |

(52) U.S. Cl.
CPC .......... *G10L 21/0232* (2013.01); *G10L 25/84* (2013.01); *G10L 21/0208* (2013.01); *G10L 21/0316* (2013.01); *G10L 2015/088* (2013.01); *G10L 2015/223* (2013.01)

(56) References Cited

U.S. PATENT DOCUMENTS

| | | | |
|---|---|---|---|
| 2014/0278435 A1* | 9/2014 | Ganong | G10L 15/22 |
| | | | 704/275 |
| 2016/0379632 A1* | 12/2016 | Hoffmeister | G10L 15/26 |
| | | | 704/253 |
| 2017/0090864 A1* | 3/2017 | Jorgovanovic | G10L 21/0332 |

FOREIGN PATENT DOCUMENTS

| | | |
|---|---|---|
| CN | 105489222 A | 4/2016 |
| CN | 105869637 A | 8/2016 |

OTHER PUBLICATIONS

PCT/CN2016/111367 International Search Report and Written Opinion dated Jan. 26, 2017, 14 pages.

* cited by examiner

METHOD AND APPARATUS FOR WAKING UP VIA SPEECH

CROSS REFERENCE TO RELATED APPLICATIONS

This application is U.S. national phase of International application PCT/CN2016/111367, filed Dec. 21, 2016, which claims priority to Chinese Patent Application Serial No. 201610357702.4, titled with "method and apparatus for waking up via speech" and filed on May 26, 2016 by BAIDU ONLINE NETWORK TECHNOLOGY (BEIJING) CO., LTD.

FIELD

The present disclosure relates to a field of speech recognition technologies, and more particularly to a method and an apparatus for waking up via a speech.

BACKGROUND

A technology for waking up via a speech (or speech (or voice) wake-up technology) is a function with a switch entry attribute. A user may initiate a human-computer interaction operation by speech wake-up. That is, the machine may be woken up by a wake-up phrase spoken by the user, and then recognize a speech command of the user.

Some technologies for waking up via the speech may exist in the related art. However, some problems exist in these technologies, for example, a high false wake-up rate, a poor noise resisting ability, online in a whole procedure, high power consumption, a single wake-up phrase, and a low wake-up sensitivity.

SUMMARY

A method for waking up via a speech provided in embodiments of the present disclosure includes: obtaining a speech signal to be processed; decoding the speech signal according to a pre-generated searching space to obtain a speech recognition result, in which the searching space includes a path where an inversion model is located, the inversion model includes a first inversion model, and the first inversion model is generated by training based on one or more word segmentation results of each of one or more wake-up phrases; when the first preset number of words of the speech recognition result is obtained, determining whether the preset number of words contains at least part of words in one of the one or more wake-up phrases; and determining cancellation of a wake-up operation directly when the preset number of words does not contain at least part of words in one of the one or more wake-up phrases, and ending the decoding of the speech signal.

Embodiments of the present disclosure further provide a terminal, including: a processor and a memory configured to store instructions executable by the processor. The processor is configured to: perform the above method.

Embodiments of the present disclosure further provide a non-transient computer readable storage medium. When instructions in the storage medium are executed by a processor of a terminal, the terminal implements the above method.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
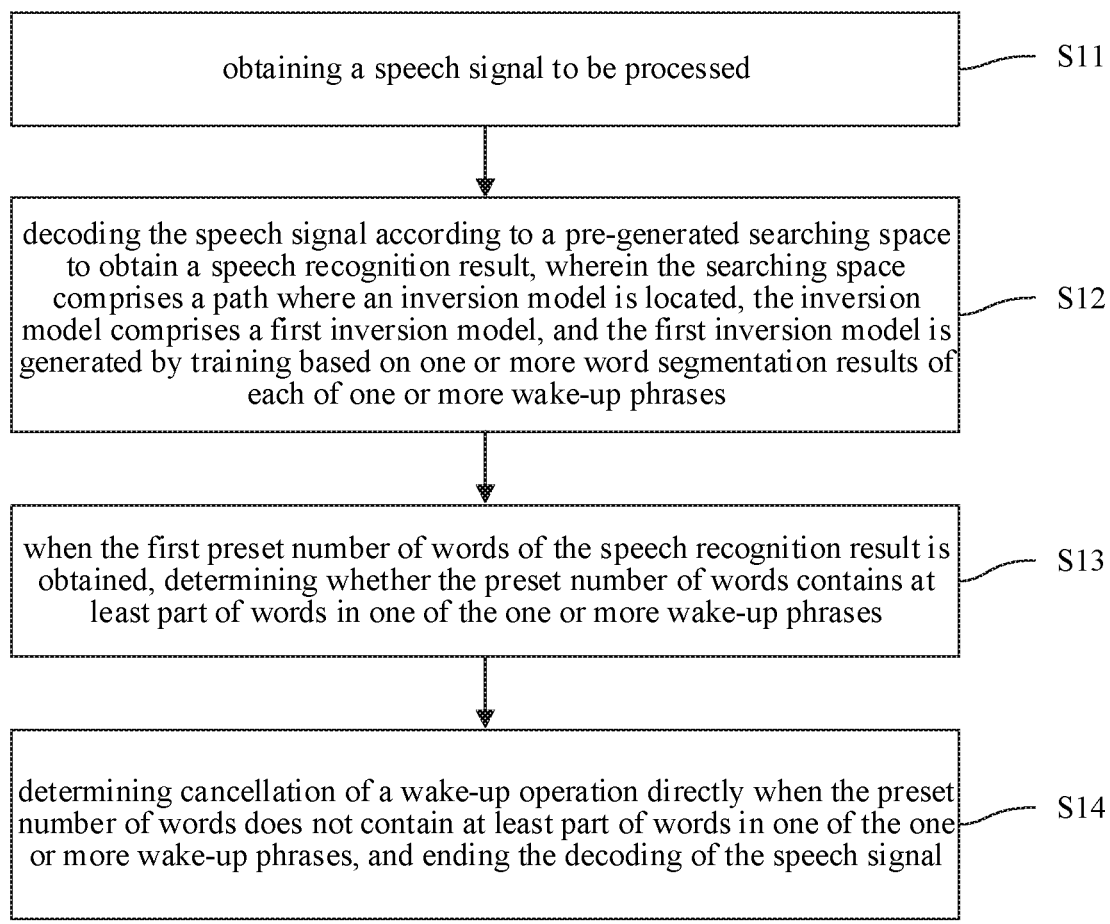
FIG. 1 is a flow chart illustrating a method for waking up via a speech provided in an embodiment of the present disclosure.

Description will be made in detail below to embodiments of the present disclosure. Examples of the embodiments are illustrated in the accompanying drawings, in which, the same or similar numbers represent the same or similar elements or elements with the same or similar functions throughout. Embodiments described below with reference to the accompanying drawings are exemplary, which are intended to explain the present disclosure and are not to be understood as a limitation of the present disclosure. In contrast, the embodiments of the present disclosure include variations, modifications and equivalents falling within the spirit and scope of the accompanying claims.

As illustrated above, some problems exist in technologies for waking up via a speech (or speech wake-up technologies) in the related art. The present disclosure may solve the problems described above based on the following.

(1) A new inversion model is established, and the inversion model is generated by training based on one or more word segmentation results of each of one or more wake-up phrases, which may avoid that it is woken up by part content of one of the one or more wake-up phrases, and may solve a problem of high false wake-up rate.

(2) Audio processing is performed on a speech signal input by a user, such as noise reduction, signal enhancement, to solve a problem of poor noise resisting ability.

(3) Another new inversion model is established, and the inversion model is generated by training based on a clustering result of a corpus, which may reduce a size of the inversion model, and may be applied in terminal local, to solve a problem of online in the whole procedure.

(4) Cancellation of a wake-up operation is determined directly based on the first preset number of words of a speech recognition result, and it is not necessary to wait for the finishing of the speech decoding, which may reduce the power consumption. In addition, when an abnormal path is found, the search of the abnormal path is ended in decoding, which may further reduce the power consumption.

(5) The number of wake-up phrases is not limited, which may be a plurality of wake-up phrases.

(6) Weight processing is performed on one or more paths where the one or more wake-up phrases are located, which may improve the wake-up sensitivity.

It should be noted that, although the main thinking corresponding to each technical problem has been illustrated above, detailed technical solutions are not limited to the foregoing main thinking to solve the technical problems, and may combine with other technical features together. Those combinations among different technical features still belong to a protection scope of the present disclosure.

It should be noted that, although several technical problems needing to be solved have been given above, the present disclosure is not limited to solve the foregoing technical problems. The technical solutions provided in the present disclosure which may further solve other technical problems shall remain within the protection scope of this present disclosure.

It should be noted that, each embodiment of the present disclosure is not limited to solve all technical problems perfectly, but to solve at least one technical problem to at least some extent.

It should be noted that, although the main thinking of the present disclosure has been given above, and embodiments will illustrate some features below. An innovation point of the present disclosure is not limited to the foregoing main thinking and contents referred by the feature point and it is not excluded that some contents that are not specifically illustrated in the present disclosure may still contain the innovation point of the present disclosure.

It should be understood that, although some illustrations have been made above, other possible solutions are not excluded, and the technical solutions which are the same, similar and equivalent with the following embodiments provided in the present disclosure still remain with the protection scope of this present disclosure.

Illustration will be made to the technical solutions of the present disclosure with reference to detailed embodiments.

A technology for waking up via a speech may be specifically applicable to offline scene, that is, a local application of a terminal. Of course, it should be understood that, the technology for waking up via the speech of the present disclosure may further be applicable to a server, to implement online speech waking up.

The terminals referred in the present disclosure may be various terminals able to employ the technology for waking up via the speech such as a mobile terminal, a vehicle terminal, an on-board terminal, and a desktop computer.

FIG. 1 is a flow chart illustrating a method for waking up via a speech provided in an embodiment of the present disclosure.

The embodiment may solve problems of high false wake-up rate and of high power consumption to at least some extent.

As illustrated in FIG. 1, a process of the embodiment includes actions in the following blocks.

In block S11: a speech signal to be processed is obtained.
An initial speech signal is input by a user.

In this embodiment, to improve the noise resisting ability, audio processing is performed on the speech signal input by the user, to obtain the speech signal to be processed. Detailed contents may refer to the following description.

In block S12: the speech signal is decoded according to a pre-generated searching space to obtain a speech recognition result, in which, the searching space includes a path where an inversion model is located, the inversion model includes a first inversion model, and the first inversion model is generated by training based on one or more word segmentation results of each of one or more wake-up phrases.

After obtaining the speech signal to be processed, feature extraction is performed on this speech signal, to obtain an acoustic feature, and then optimal path searching is performed in the searching space by employing the acoustic feature. Text corresponding to the optimal path is determined as the speech recognition result.

The searching space includes a plurality of paths, and specifically includes: a path where each of the one or more wake-up phrases is located and a path where the inversion model is located. The inversion model is configured to guide the non-awake phrase to the path where the inversion model is located in speech decoding.

In this embodiment, the inversion model is called as a first inversion model, and the first inversion model is generated by training based on the one or more word segmentation results of each of the one or more wake-up phrases. For example, if the wake-up phrase is "百度一下 (Chinese characters, which means searching by Baidu search engine or Baidu one time)" (the wake-up phrase may be set), word segmentation is performed on the wake-up phrase. A principle of the word segmentation may be dividing the wake-up phrase into the first word, and dividing the wake-up phrase into parts including two words when the number of words in the wake-up phrase is greater than three. For example, the word segmentation results are "百 (Bai, the first word)", "百度 (Baidu, the part including two words)" and "一下 (one time, the part including two words)", in which "百度 (Baidu)" and "一下 (one time)" may be taken as training data to participate in inversion model training, to obtain the first inversion model.

"百 (Bai)+non '度一下 (du one time)'", or "百度 (Baidu)+non '一下 (one time)'" may be guided to the path where the inversion model is located by the first inversion model, to avoid a false wake-up operation.

In block S13: when the first preset number of words of the speech recognition result is obtained, it is determined whether the preset number of words contains at least part of words in one of the one or more wake-up phrases.

The preset number of words, for example, may be 3. When the first 3 words corresponding to the speech signal are obtained, it may be determined whether the first 3 words contain at least part of words in the wake-up phrase. For example, if the wake-up phrase is "百度一下", it is determined whether the first 3 words are "百度一", or it is determined whether the last two words in the first 3 words are "百度", or it is determined whether the last one word in the first 3 words is "百".

In block S14: cancellation of a wake-up operation directly is determined when the preset number of words does not contain at least part of words in one of the one or more wake-up phrases, and the decoding of the speech signal is ended.

For example, when the first 3 words are not "百度一", and the last two words in the first 3 words are not "百度", and the last one word in the first three words is not "百", cancellation of the wake-up operation directly is determined, and the wake-up operation is not performed.

In addition, the decoding of the speech signal is directly ended when cancellation of the wake-up operation is determined based on the first three words. That is, since the speech signal is a segment of signals, the segment of signals further includes one or more words in the following besides the first 3 words. In the embodiment, when the first 3 words are recognized, and cancellation of the wake-up operation is determined based on the first 3 words, there is no need to recognize the one or more words in the following, and recognition for the segment of signals is directly ended, such that the power consumption may be reduced.

In the embodiment, the false wake-up rate may be reduced by employing the first inversion model generated by training based on the one or more word segmentation results of each of the one or more wake-up phrases. Cancellation of the wake-up operation is directly determined, and the decoding of the speech signal is ended, when the preset number of words does not contain at least part of words in one of the one or more wake-up phrases, such that the power consumption may be reduced.

Figure 2:
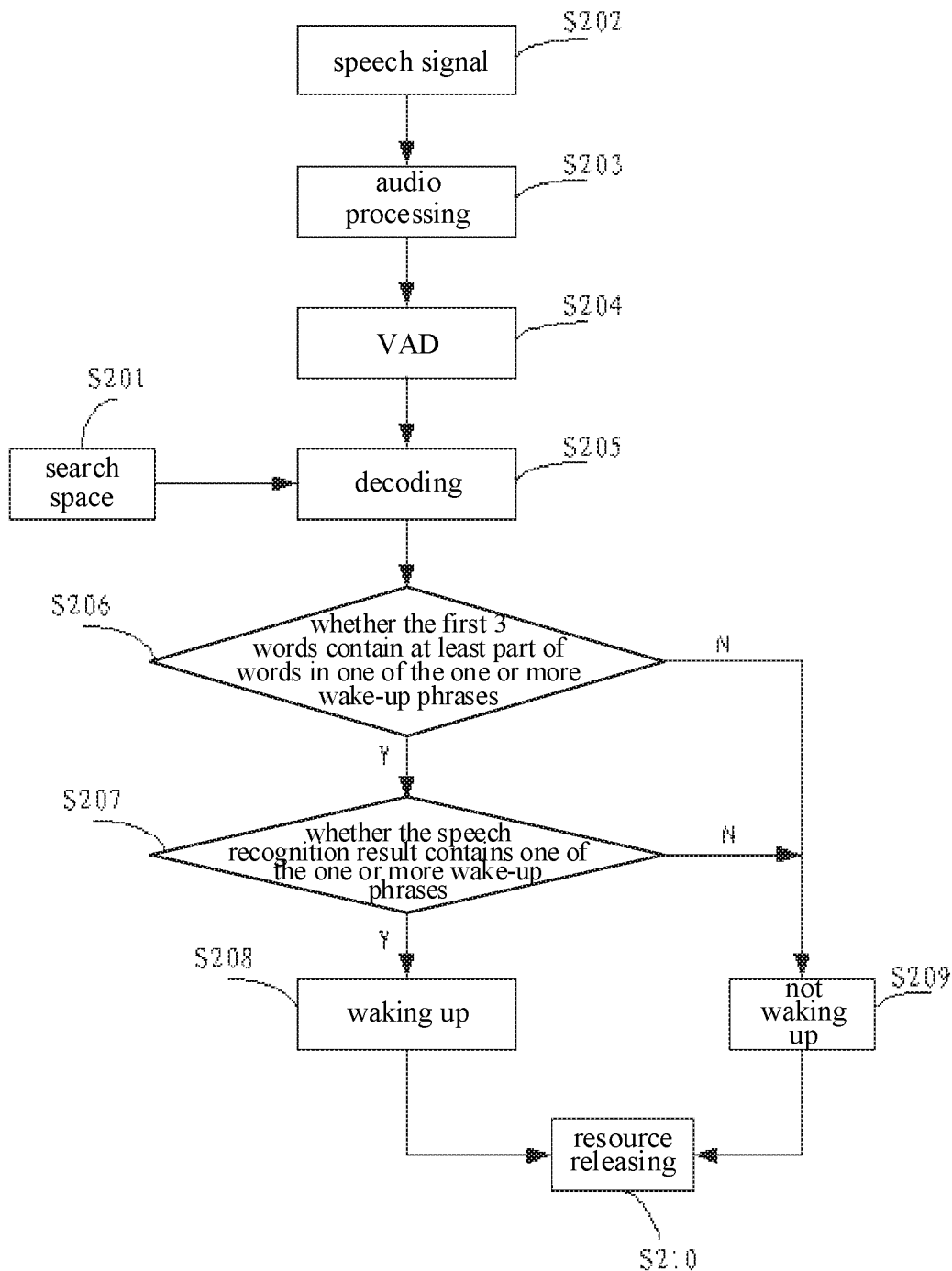
FIG. 2 is a flow chart illustrating a method for waking up via a speech provided in another embodiment of the present disclosure.

FIG. 2 is a flow chart illustrating a method for waking up via a speech provided in another embodiment of the present disclosure.

The embodiment may solve one of the problems of high false wake-up rate, of high power consumption, of online in the whole procedure, of poor noise resisting ability, of the single wake-up phrase, and of low wake-up sensitivity, to at least some extent.

It should be understood that, the embodiment provides a technical solution solving more comprehensive problems. However, the present disclosure is not limited to the technical solution of the embodiment. The technical features solving different technical solutions separately form the technical solutions, or, any number of the different technical features are combined in other ways to obtain new technical solutions.

As illustrated in FIG. 2, the process of the embodiment includes actions in the following blocks.

In block S201: a search space is generated.

Figure 3:
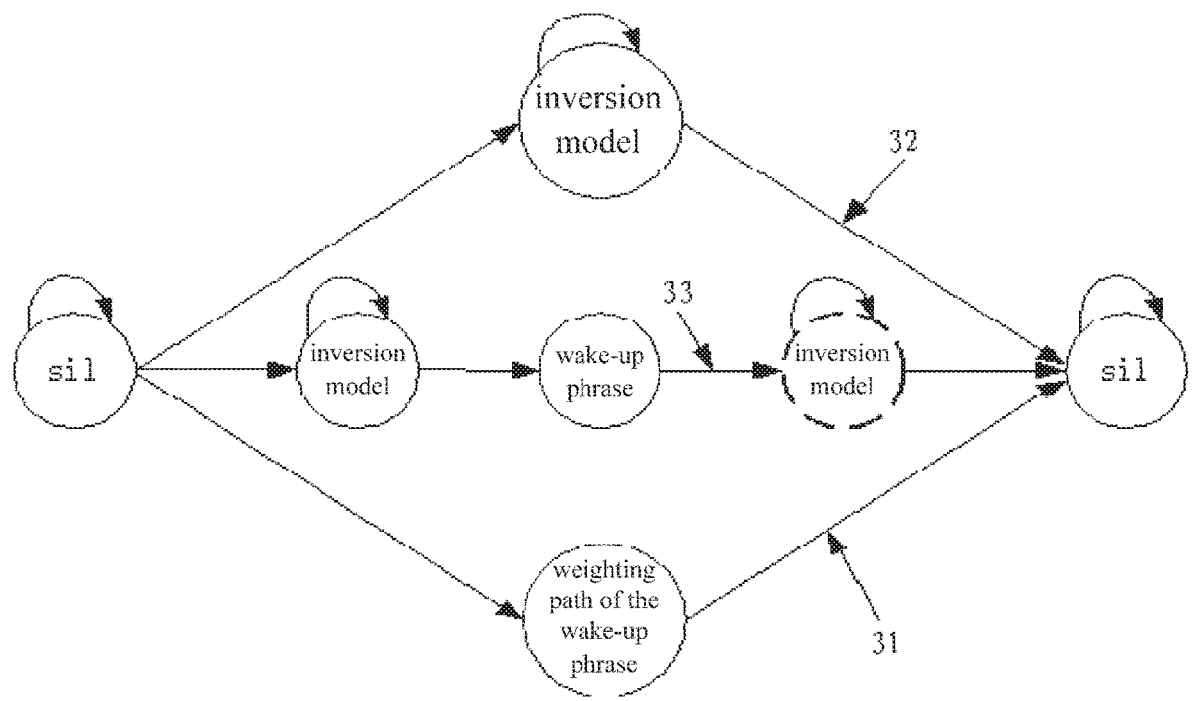
FIG. 3 is a schematic diagram illustrating a searching space in embodiments of the present disclosure.

As illustrated in FIG. 3, the search space may include a plurality of paths, which include a path 31 where one of the one or more wake-up phrases is located and a path 32 where the inversion model is located.

In the embodiment, to solve the problem that a sentence of the user mixes up one of the one or more wake-up phrases, the search space further includes a path 33 where one of the one or more wake-up phrases and the inversion model are coupled in series.

Further, after passing one of the one or more wake-up phrases in the path 33, a silence (SIL) state may be entered directly, or the inversion model is passed and then the SIL state is entered.

In the embodiment, to improve the wake-up sensitivity, weighting processing may further be performed on the one or more paths where the one or more wake-up phrases are located. That is, the weighting of the one or more paths where the one or more wake-up phrases are located may be added based on the original weighting, to make the one or more wake-up phrases be easier to enter the one or more paths where the one or more wake-up phrases are located.

A plurality of wake-up phrases may be set.

The foregoing inversion model may include a first inversion model and a second inversion model. The inversion model may be formed by connecting the first inversion model and the second inversion model in parallel, or may by weighting connecting the first inversion model and the second inversion model in parallel or the like.

As illustrated above, the first inversion model is generated by training based on the one or more word segmentation results of each of the one or more wake-up phrases.

In the embodiment, the second inversion model is not generated by directly training based on a corpus, but generated by training based on a clustering result of the corpus, to reduce the size of the second inversion model, which is more useful for being applicable to the terminal local.

In detail, syllables of pronunciation are clustered by using some common speech corpora, for example, the number of the syllables of pronunciation is clustered into 26, then the 26 syllables correspond to 26 words, and then the second inversion model is generated by training based on the 26 words. The second inversion model is a simplified model.

The generation of the search space may be finished by the foregoing process.

It may be understood that, the search space may be pre-generated before waking up via speech.

The actions in the following blocks may further be performed when it needs to wake up via the speech.

In block S202: a speech signal input by the user is received.

For example, the user speaks a segment of words to the terminal.

It should be understood that, some initial process may further be performed before receiving the speech signal. For example, the wake-up phrase may be set, the search space may be generated, and initialization may be performed on an audio processing module.

In block S203, audio processing is performed on the speech signal input by the user.

The audio processing in the embodiment may specifically include: noise reduction and speech enhancement processing.

The noise reduction may include noise reduction for low frequency noise and noise reduction for non-low frequency noise.

In detail, noise such as air conditioners and vehicle engines, belongs to the low frequency noise, which may be removed by employing a high pass filtering.

Noise such as background music or human voice belongs to the non-low frequency noise, which may be removed by employing noise suppression (NS).

A volume of some speech signals may be in a low level since the speech signals are influenced by different gains of a hardware microphone, speech enhancement may be performed by employing an automatic gain control (AGC) technology, to increase energy of the audio signals with the too low volume to a level which may be recognized.

In S204, voice activity detection (VAD) is performed on the speech signal after the audio processing.

A speech signal to be processed may be obtained by VAD.

In S205, the speech signal to be processed is decoded based on the search space, to obtain a speech recognition result.

In decoding, the acoustic feature is extracted from the speech signal, and then the acoustic feature is searched in the search space, to obtain an optimal path as the speech recognition result. In detail, the search algorithm may be a viterbi search algorithm.

In the embodiment, when finding an abnormal path in decoding, the search of the abnormal path is ended, such that a search scope may be decreased, the search efficiency may be improved and the power consumption may be reduced. In determining the abnormal path, taking the acoustic model is a hidden markov model (HMM) as an example, when a difference between scores of the acoustic models of neighboring states obtained when searching on one path is greater than a preset value, the path may be determined as the abnormal path.

Further, when a segment of the speech detected based on VAD contains one or more wake-up phrases, the VAD may be reset immediately after detecting the one or more wake-up phrases, and the process of detecting the one or more phrases may be restarted, to avoid a phenomenon that the segment of VAD may only hit one wake-up phrase.

In block S206, when the first 3 words of the speech recognition result is obtained, it is determined whether the first 3 words contain at least one part of words in one of the one or more wake-up phrases, if yes, the action in block S207 is performed, otherwise, the action in block S209 is performed.

In block S207, the speech recognition is continuous, and it is determined whether the speech recognition result contains one of the one or more wake-up phrases, if yes, the action in block S208 is performed, otherwise the action in block S209 is performed.

In block S208: the wake-up operation is performed.

In block S209: the wake-up operation is not performed.

When connecting block S207 and determining cancellation of the wake-up operation, decoding the speech signal is further ended directly.

In S210: resource is released.

After cancellation of the wake-up operation or performing the wake-up operation, the resource may be released.

The main function of releasing resource is to release a memory occupied by respective resource loaded by the initialization, to finish reset work of a wake-up module, and to clear content such as history cache data.

In the embodiment, the false wake-up rate may be reduced by employing the first inversion model generated by training based on the one or more word segmentation results of each of the one or more wake-up phrases. Cancellation of the wake-up operation is directly determined and the decoding of the speech signal is ended when the first preset number of words in the speech recognition result does not contain at least part of words in one of the one or more wake-up phrases, such that the power consumption may be reduced. The noise resisting ability is improved by performing the audio processing on the speech signal. The size of the inversion model may be reduced by generating the inversion model via training based on the clustering result of the corpus, such that the inversion model may be applicable to the terminal local, to solve the problem of online in the whole procedure. By setting a plurality of wake-up phrases, a wake-up operation may be implemented via any of the one or more wake-up phrases. The wake-up sensitivity may be improved by preforming weighting processing on the one or more paths where the one or more wake-up phrases are located. The power consumption is reduced by ending the search of the abnormal path when finding the abnormal path in decoding. The wake-up operation may be still successful when the sentence of the user mixing up one of the one or more wake-up phrases by that the search space includes the path where the inversion model and one of the one or more wake-up phrases are coupled in series, such that the wake-up accuracy is improved.

Figure 4:
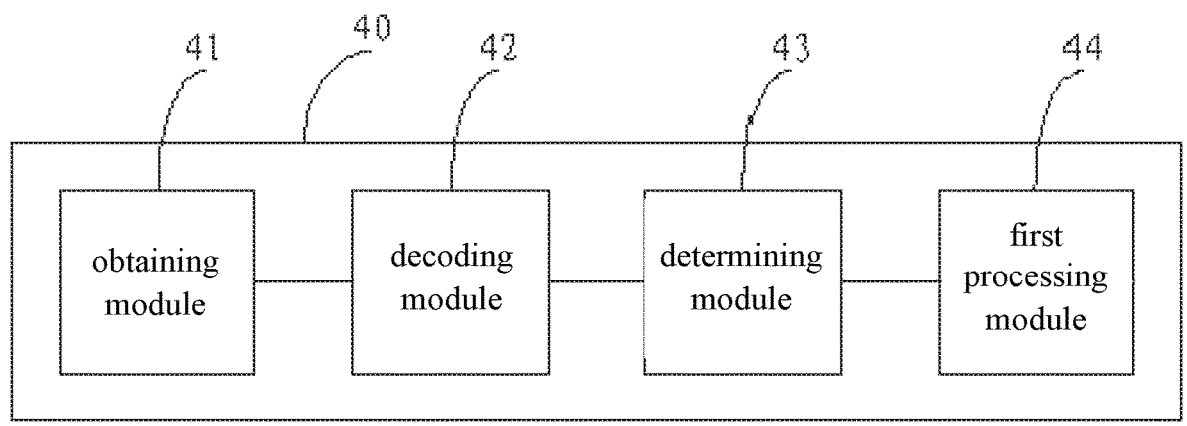
FIG. 4 is a block diagram illustrating an apparatus for waking up via a speech provided in an embodiment of the present disclosure.

FIG. 4 is a block diagram illustrating an apparatus for waking up via a speech provided in an embodiment of the present disclosure.

As illustrated in FIG. 4, the apparatus 40 includes: an obtaining module 41, a decoding module 42, a determining module 43 and a first processing module 44.

The obtaining module 41 is configured to obtain a speech signal to be processed.

The decoding module 42 is configured to decode the speech signal according to a pre-generated searching space to obtain a speech recognition result, in which the searching space includes a path where an inversion model is located, the inversion model includes a first inversion model, and the first inversion model is generated by training based on one or more word segmentation results of each of one or more wake-up phrases.

The determining module 43 is configured to, when the first preset number of words of the speech recognition result is obtained, determine whether the preset number of words contains at least part of words in one of the one or more wake-up phrases.

The first processing module 44 is configured to determine cancellation of a wake-up operation directly when the preset number of words does not contain at least part of words in one of the one or more wake-up phrases, and end the decoding of the speech signal.

Figure 5:
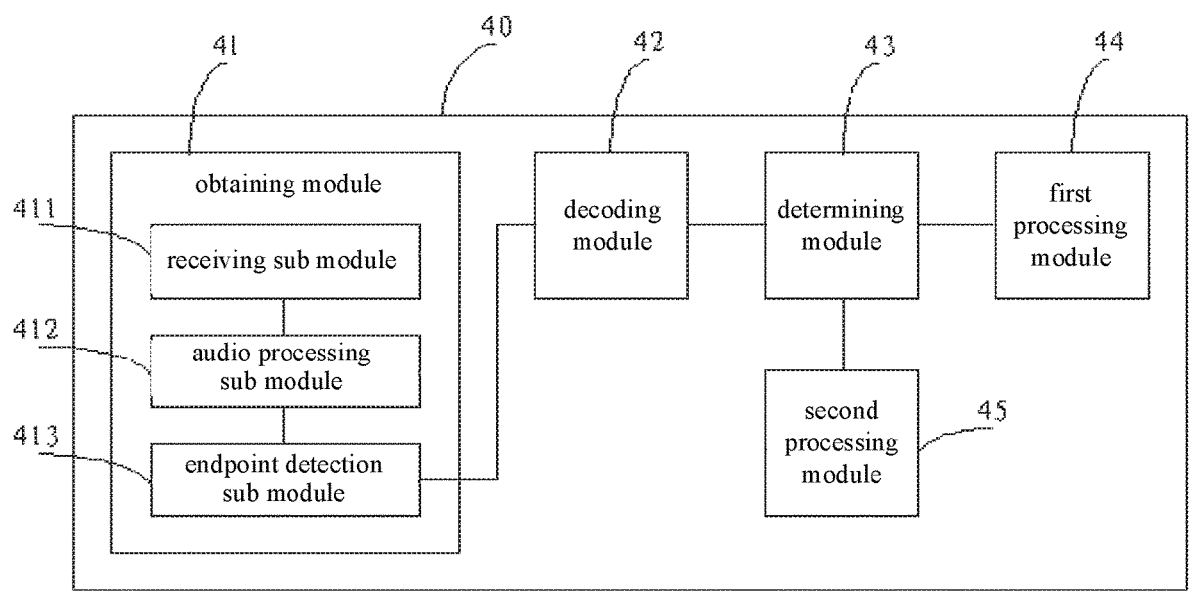
FIG. 5 is a block diagram illustrating an apparatus for waking up via a speech provided in an embodiment of the present disclosure.

In some embodiments, as illustrated in FIG. 5, the obtaining module 41 includes: a receiving sub module 411, an audio processing sub module 412 and an endpoint detection sub module 413.

The receiving sub module 411 is configured to receive a speech signal input by a user.

The audio processing sub module 412 is configured to perform audio processing on the speech signal input by the user.

The endpoint detection sub module 413 is configured to perform voice activity detection (VAD) on the speech signal after the audio processing, to obtain the speech signal to be processed.

In some embodiments, the audio processing sub module 412 is specifically configured to:

perform high pass filtering on the speech signal input by the user, to remove low frequency noise;

perform noise reduction on the speech signal input by the user, to remove non-low frequency noise; and perform AGC on the speech signal input by the user, to increase intensity of the speech signal.

In some embodiments, as illustrated in FIG. 5, the apparatus 40 may further includes a second processing module 45.

The second processing module 45 is configured to decode the speech signal continuously to obtain a whole speech recognition result corresponding to the speech signal when the preset number of words contains at least part of words in one of the one or more wake-up phrases; and perform the wake-up operation when the whole speech recognition result contains one of the one or more wake-up phrases.

In some embodiments, the inversion model further includes: a second inversion model. The inversion model is generated by training based on a clustering result of a corpus.

In some embodiments, the search space further includes a path where each of the one or more wake-up phrases are located. Weighting processing is performed on the one or more paths where the one or more wake-up phrases are located.

In some embodiments, the search space further includes: a path where the inversion model and one of the one or more wake-up phrases are coupled in series.

In some embodiments, the decoding model 42 is specifically configured to end the search of an abnormal path in responding to finding an abnormal path in decoding.

In some embodiments, the one or more wake-up phrases are a plurality of wake-up phrases.

It should be understood that, the apparatus of the embodiment corresponds to the method of the foregoing embodiments, and the specific contents may refer to related description of the method of embodiments, which will not be illustrated in detail herein.

In the embodiment, the false wake-up rate may be reduced by employing the first inversion model generated by training based on the one or more word segmentation results of each of the one or more wake-up phrases. Cancellation of the wake-up operation is directly determined and the decoding of the speech signal is ended when the first preset number of words in the speech recognition result does not contain at least part of words in one of the one or more wake-up phrases, such that the power consumption may be reduced. The noise resisting ability is improved by performing the audio processing on the speech signal. The size of the inversion model may be reduced by generating the inversion model via training based on the clustering result of the corpus, such that the inversion model may be applicable to the terminal local, to solve the problem of online in the whole procedure. By setting a plurality of wake-up phrases, a wake-up operation may be implemented via any of the one or more wake-up phrases. The wake-up sensitivity may be improved by preforming weighting processing on the one or more paths where the one or more wake-up phrases are located. The power consumption is reduced by ending the search of the abnormal path when finding the abnormal path in decoding. The wake-up operation may be still successful when the sentence of the user mixing up one of the one or more wake-up phrases by that the search space includes the path where the inversion model and one of the one or more wake-up phrases are coupled in series, such that the wake-up accuracy is improved.

It should be understood that, the same or similar parts in the respective embodiments above may refer to each other. Contents not illustrated in detail in some embodiments may refer to the same or similar contents in other embodiments.

Embodiments of the present disclosure further provide a terminal, including: a processor and a memory. The memory is configured to store instructions executable by the processor; in which, the processor is configured to: obtain a speech signal to be processed; decode the speech signal according to a pre-generated searching space to obtain a speech recognition result, in which the searching space includes a path where an inversion model is located, the inversion model includes a first inversion model, and the first inversion model is generated by training based on one or more word segmentation results of each of one or more wake-up phrases; when the first preset number of words of the speech recognition result is obtained, determine whether the preset number of words contains at least part of words in one of the one or more wake-up phrases; and determine cancellation of a wake-up operation directly when the preset number of words does not contain at least part of words in one of the one or more wake-up phrases, and end the decoding of the speech signal.

Embodiments of the present disclosure further provide a non-transient computer readable storage medium. When instructions in the storage medium are configured to be executed by a processor of a terminal, the terminal implements one method, which includes: obtaining a speech signal to be processed; decoding the speech signal according to a pre-generated searching space to obtain a speech recognition result, in which the searching space includes a path where an inversion model is located, the inversion model includes a first inversion model, and the first inversion model is generated by training based on one or more word segmentation results of each of one or more wake-up phrases; when the first preset number of words of the speech recognition result is obtained, determining whether the preset number of words contains at least part of words in one of the one or more wake-up phrases; and determining cancellation of a wake-up operation directly when the preset number of words does not contain at least part of words in one of the one or more wake-up phrases, and ending the decoding of the speech signal.

Embodiments of the present disclosure further provide a computer program product. When instructions in the computer program product are configured to be executed by a processor, one method is executed, which includes: obtaining a speech signal to be processed; decoding the speech signal according to a pre-generated searching space to obtain a speech recognition result, in which the searching space includes a path where an inversion model is located, the inversion model includes a first inversion model, and the first inversion model is generated by training based on one or more word segmentation results of each of one or more wake-up phrases; when the first preset number of words of the speech recognition result is obtained, determining whether the preset number of words contains at least part of words in one of the one or more wake-up phrases; and determining cancellation of a wake-up operation directly when the preset number of words does not contain at least part of words in one of the one or more wake-up phrases, and ending the decoding of the speech signal.

It should be understood that, in the description of the present disclosure, the terms "first", "second" is only for description purpose, it cannot be understood as indicating or implying its relative importance. Thus, in the description of the present disclosure, "a plurality of" means at least two unless specified otherwise.

Any procedure or method described in the flow charts or described in any other way herein may be understood include one or more modules, portions or parts for executing instruction codes that implement steps of a custom logic function or procedure. And preferable embodiments of the present disclosure include other implementations, in which the order of execution is different from that which is depicted or discussed, including executing functions in a substantially simultaneous manner or in an opposite order according to the related functions, which may be understood by the skilled in the art of embodiments of the present disclosure.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an Application Specific Integrated Circuit (ASIC) having appropriate combinational logic gates, a Programmable Gate Array(s) (PGA), a Field Programmable Gate Array (FPGA), etc.

The common technical personnel in the field may understand that all or some steps in the above embodiments may be completed by the means that relevant hardware is instructed by a program. The program may be stored in a computer readable storage medium, and the program includes any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a read only memory, a magnetic disk or a disk and the like.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure.

What is claimed is:

1. A method for waking up via a speech, comprising:
   obtaining a speech signal to be processed;
   decoding the speech signal according to a pre-generated searching space to obtain a speech recognition result, wherein the searching space comprises a path where an inversion model is located, the inversion model comprises a first inversion model and a second inversion model, and the first inversion model is generated by training based on one or more word segmentation results of each of one or more wake-up phrases, the second inversion model is generated by training based on a clustering result of a corpus;
   when the first preset number of words of the speech recognition result is obtained, determining whether the preset number of words contains at least part of words in one of the one or more wake-up phrases; and
   determining cancellation of a wake-up operation directly when the preset number of words does not contain at least part of words in one of the one or more wake-up phrases, and ending the decoding of the speech signal.

2. The method according to claim 1, wherein, obtaining the speech signal to be processed, comprises:
   receiving a speech signal input by a user;
   performing audio processing on the speech signal input by the user;
   performing voice activity detection (VAD) on the speech signal after the audio processing, to obtain the speech signal to be processed.

3. The method according to claim 2, wherein, performing the audio processing on the speech signal input by the user, comprises:
   performing high pass filtering on the speech signal input by the user, to remove low-frequency noise;
   performing noise suppression on the speech signal input by the user, to remove non-low-frequency noise;
   performing automatic gain control (AGC) on the speech signal input by the user, to increase intensity of the speech signal.

4. The method according to claim 1, further comprising:
   decoding the speech signal continuously to obtain a whole speech recognition result corresponding to the speech signal when the preset number of words contains at least part of words in one of the one or more wake-up phrases; and
   performing the wake-up operation when the whole speech recognition result contains one of the one or more wake-up phrases.

5. The method according to claim 1, wherein, the searching space further comprises one or more paths where the one or more wake-up phrases are located, and weighting processing is performed on the one or more paths where the one or more wake-up phrases are located.

6. The method according to claim 1, wherein, the searching space further comprises a path where the inversion model and each of the one or more wake-up phrases are coupled in series.

7. The method according to claim 1, further comprising:
   ending a search of an abnormal path in responding to finding the abnormal path in decoding.

8. The method according to claim 1, wherein, the one or more wake-up phrases comprises a plurality of wake-up phrases.

9. A terminal, comprising: a processor; and a memory configured to store instructions executable by the processor; wherein, the processor is configured to:
   obtain a speech signal to be processed;
   decode the speech signal according to a pre-generated searching space to obtain a speech recognition result, wherein the searching space comprises a path where an inversion model is located, the inversion model comprises a first inversion model and a second inversion model, and the first inversion model is generated by training based on one or more word segmentation results of each of one or more wake-up phrases, the second inversion model is generated by training based on a clustering result of a corpus;
   when the first preset number of words of the speech recognition result is obtained, determine whether the preset number of words contains at least part of words in one of the one or more wake-up phrases; and
   determine cancellation of a wake-up operation directly when the preset number of words does not contain at least part of words in one of the one or more wake-up phrases, and ending the decoding of the speech signal.

10. A non-transient computer readable storage medium, wherein, when instructions in the storage medium are executed by a processor of a terminal, the terminal implements a method, and the method comprises:
    obtaining a speech signal to be processed;
    decoding the speech signal according to a pre-generated searching space to obtain a speech recognition result, wherein the searching space comprises a path where an inversion model is located, the inversion model comprises a first inversion model and a second inversion model, and the first inversion model is generated by training based on one or more word segmentation results of each of one or more wake-up phrases, the second inversion model is generated by training based on a clustering result of a corpus;
    when the first preset number of words of the speech recognition result is obtained, determining whether the preset number of words contains at least part of words in one of the one or more wake-up phrases; and determining cancellation of a wake-up operation directly when the preset number of words does not contain at least part of words in one of the one or more wake-up phrases, and ending the decoding of the speech signal.

11. The terminal according to claim 9, wherein, the processor is configured to obtain the speech signal to be processed by actions of:

receiving a speech signal input by a user;

performing audio processing on the speech signal input by the user;

performing voice activity detection (VAD) on the speech signal after the audio processing, to obtain the speech signal to be processed.

12. The terminal according to claim 11, wherein, the processor is configured to perform the audio processing on the speech signal input by the user by actions of:

performing high pass filtering on the speech signal input by the user, to remove low-frequency noise;

performing noise suppression on the speech signal input by the user, to remove non-low-frequency noise;

performing automatic gain control (AGC) on the speech signal input by the user, to increase intensity of the speech signal.

13. The terminal according to claim 9, wherein, the processor is configured to decode the speech signal continuously to obtain a whole speech recognition result corresponding to the speech signal when the preset number of words contains at least part of words in one of the one or more wake-up phrases; and perform the wake-up operation when the whole speech recognition result contains one of the one or more wake-up phrases.

14. The terminal according to claim 9, wherein, the searching space further comprises one or more paths where the one or more wake-up phrases are located, and weighting processing is performed on the one or more paths where the one or more wake-up phrases are located.

15. The terminal according to claim 9, wherein, the searching space further comprises a path where the inversion model and each of the one or more wake-up phrases are coupled in series.

16. The terminal according to claim 9, wherein, the processor is configured to:

end a search of an abnormal path in responding to finding the abnormal path in decoding.

17. The terminal according to claim 9, wherein, the one or more wake-up phrases comprises a plurality of wake-up phrases.

* * * * *